United States Patent Office 3,407,485
Patented Oct. 29, 1968

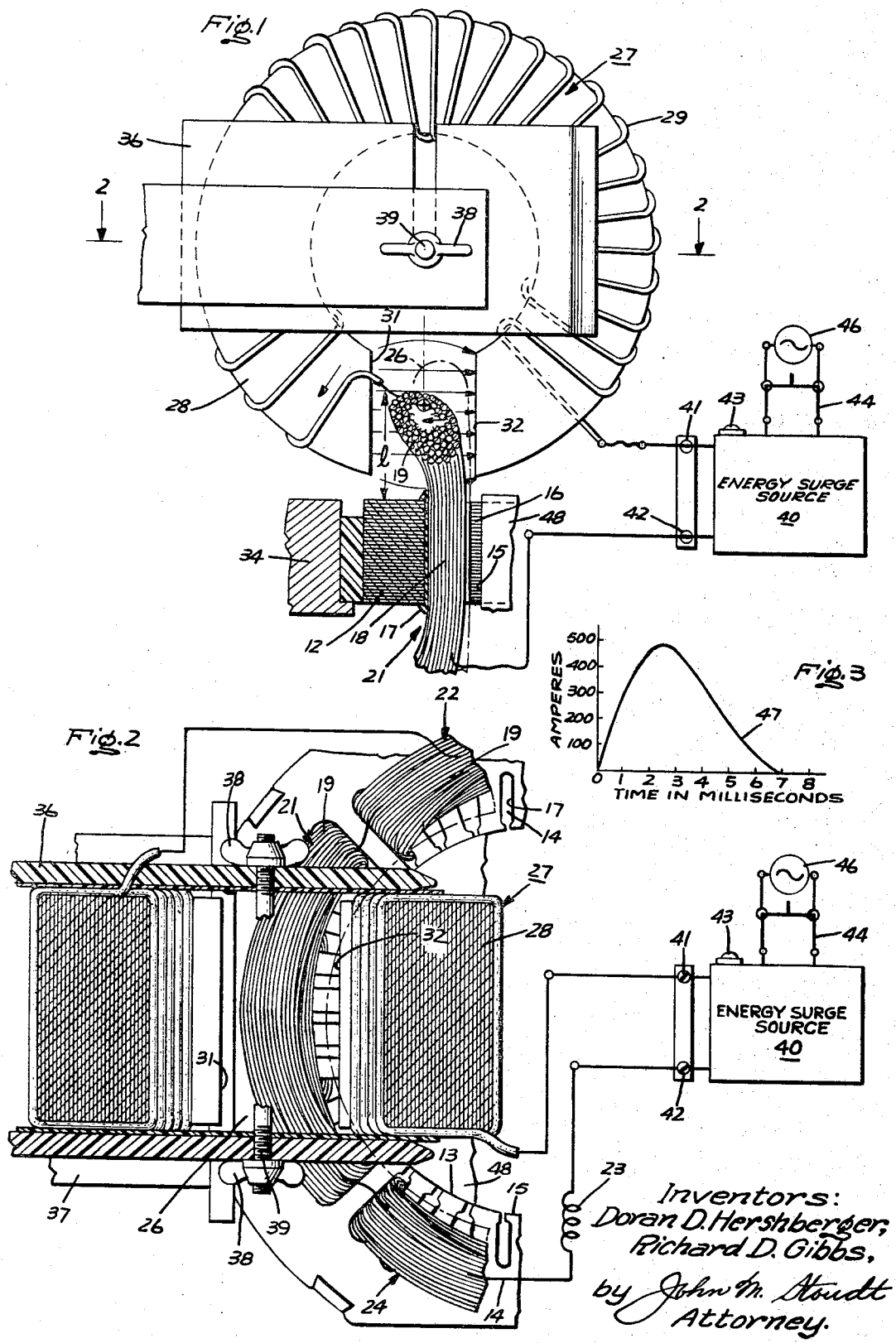

3,407,485
METHOD FOR CONTROLLING THE DESIRED POSITION OF COIL END TURNS RELATIVE TO A TURN-ACCOMMODATING MEMBER
Doran D. Hershberger, Sycamore, Ill., and Richard D. Gibbs, Murfreesboro, Tenn., assignors to General Electric Company, a corporation of New York
Filed Aug. 17, 1967, Ser. No. 661,316
5 Claims. (Cl. 29—596)

ABSTRACT OF THE DISCLOSURE

A process for accurately controlling the final position of coil end turn portions relative to the end face of a magnetic core where the portions are initially disposed in the vicinity of an air gap of an electromagnetic device. A surge of electrical energy is injected into the coil end turn portions and the device such that a transient surge of flux passes across the air gap and transient magneic fields surround the end turn portion. This, in turn, produces a high level of electromagnetic forces for a given energy surge to effect the desired accurate transfer and compaction of the end turn portions without use for end turn dies or the like.

Background of the invention

The present invention relates to an improved process for controlling the desired position of coil end turns relative to a turn-accommodating member, and in particular, to the attainment of a compacted end turn portion and of an accurate position of that compacted end turn portion with respect to an adjacent end face of a magnetic core using electrical energy without use of auxiliary die equipment.

In the manufacture of coil-carrying electrical inductive devices, for example stator cores for use in fractional and small horsepower dynamoelectric machines, it is usually necessary to transform coils from one configuration to another as they are carried in a turn-accommodating member or structure. Taking the stator core by way of illustration, the coil side turn portions as well as coil end turn portions, which project beyond the side faces of the core, are normally compacted and pressed back away from the stator bore. Recent innovations now allow this coil compaction and press-back to be performed with electrical energy rather than by conventional brute force techniques. U.S. Patents 3,333,328—R. G. Rushing; 3,333,329—C. E. Linkous; 3,333,330—C. E. Linkous; and 3,333,335—M. W. Sims are representative of such innovations.

Some inductive device applications, due to space and other design limitations in a given application, require a construction in which the individual end turn portions are as compact as possible, with the portions being located quite accurately relative to at least one adjacent end face of the structure. These exceptionally accurate positions of the end turn portions are difficult to achieve without use of some die arrangement in view of the inherent flexibility of the turns and the tendency of the end turn portions to oscillate rapidly while traveling slightly beyond the position they finally assume when electrical energy is employed.

Consequently, it is quite desirable that an economical yet versatile process employing electrical energy be provided which is capable of attaining a high degree of compaction for end turn portions and an unusually accurate positioning of these portions relative to an end face of the structure without resorting to the use of dies and the like. It is further desirable that such process either compact and press-back coil side turn portions accommodated in the slotted structure or in the alternative where the side turn portions have already been forced back the desired amount, attain the desired results concerning the end turn portions without disturbing to any extent the positions of the side turn portions relative to the slots of the structure.

Accordingly, it is an object of the present invention to provide an improved process or method for achieving accurately controlled positions of electrical coils relative to slotted structures carrying the coils, and more specifically, to provide an improved and economical, yet versatile, process for attaining the accurate position of and turn portions relative to end faces of magnetic cores accommodating side turn portions of the coils.

It is another object of the present invention to provide an improved process which achieves at least some of the desirable features and overcomes the difficulties mentioned above.

Summary of the invention

In carrying out the objects in one form, we provide an improved process for achieving accurate positions of electrical coils relative to slotted structures carrying the coils, for example, dynamoelectric machine stator cores, which have coil end turn portions extending beyond the end faces of the core and coil side turn portions accommodated in slots next to the stator bore. One or more of the end turn portions are initially placed in the vicinity of an air gap of an electromagnetic device, with the coil and device connected in circuit to a suitable source for supplying an electrical energy surge. A surge of electrical energy, selected to accomplish the desired results without causing damage to the coil and device, is supplied to both the coil and device from the source as the end turn portions are maintained in the vicinity of the air gap.

This surge produces a transient surge of flux across the air gap and interacting transient magnetic fields around the end turn portions, which in turn create electromagnetic forces to act on the end turn portions for accurately transferring these portions from the initial position into the desired position relative to the air gap and to the adjacent end face of the stator core. At the same time, compaction of the end turn portions is effected. The size of the air gap, initial location of the end turn portions relative to the gap and adjacent end face, and the magnitude of the electrical energy surge are some of the principal factors which will control the ultimate position attained by the end turn portions relative to the adjacent core end face.

If desired, press-back and compaction of the coil side turn portions may also be achieved by disposing electrically conductive material next to these portions as the end turn portions are being transferred to the desired positions. The electrical energy surge will thus establish a transient magnetic field next to the side turn portions and material, causing an electromagnetic force interaction between the portions and material to effect the desired results.

Consequently, by an economical and versatile process, an unusually accurate positioning of the coil end turn portions is possible without resorting to the use of end turn dies and the like. Moreover, a high degree of coil compaction is also possible, including a concurrent press-back and compaction the side turn portions if such is desired.

The subject matter which we regard as our invention is particularly pointed out and distinctly claimed in the concluding portion of this specification. Our invention itself, however, both as to its organization and method of operation, together with further objects and advantages thereof may best be understood by reference to the following description taken in connection with the accompanying drawing which illustrates the preferred embodiment of the invention.

Brief description of the drawing

FIGURE 1 is a sectional view in schematic form showing end turn portions of an electrical coil carried by a stator core placed in the air gap of an electromagnetic device, with a surge of electrical energy being supplied to the coil and electromagnetic device for compacting and accurately pressing back the coil relative to the core;

FIGURE 2 is a view taken along line 2—2 in FIGURE 1 to show details of the arrangement more schematically illustrated in FIGURE 1; and FIGURE 3 is a graph showing a representative energy surge of the type which may be supplied to the electromagnetic device and the coil of FIGURE 1, the graph showing a transient surge of current plotted against time.

Description of the preferred embodiment

Turning now to a more detailed consideration of the drawing, the preferred embodiment of the present invention is shown, merely by way of illustration, in connection with a stator 10 of the type disclosed in U.S. Patent 2,795,712 issued to Fred W. Suhr on June 11, 1957, and assigned to the same assignee as the present invention. The stator has a magnetic core fabricated from a number of aligned laminations, each punched or stamped from suitable relatively thin magnetic sheet material, such as iron or electrical steel, into the illustrated configuration. The laminations are conventionally secured together in stacked relation to form an outer yoke section 12, angularly spaced apart tooth sections 13, and coil accommodating slots 14 which are in communication with an axial rotor-receiving bore 15 through entrances 16. The slots have the customary electrical insulation along the walls in the form of slot liners 17 and certain of the slots carry side turn portions 18 of electrical coils which have end turn portions 19 extending axially beyond each radial end face of the core.

In the exemplification, the coils are carried by the core in four identical coil groups 21–24 inclusive (FIGURE 2) with each group being formed by three serially connected concentric coils respectively spanning four, six, and eight teeth sections. Each coil in turn is wound of a predetermined number of enameled wire conductor turns formed of electrically conductive material, such as aluminum, copper, or the like having a coating of electrical insulation adhering to this outer surface.

Having specific reference to FIGURES 1 and 2, they depict a part of the stator and coils in which the phantom line is representative of the relative positions of the end turn portions of the coil groups with respect to the adjacent end faces of the core, positions generally obtained by virtue of the winding equipment presently employed to insert the coils in the core slots. For the sake of simplicity in explaining the principles of the present invention, one form of the method has been illustrated in connection with one end turn portion of a single coil group 21 in the exemplification, but it will be appreciated from the following that the method may be practiced in connection with end turn portions of one or more coils as well as one or more coil groups as circumstances dictate. However, where more than one coil is involved, it is quite desirable from the standpoint of time and expense to press back all of the end turn portions concurrently.

At this stage of the stator fabrication, there is a general tendency for the radially inner turns to be urged in the direction of the core axis, the individual turns being somewhat loosely distributed in the slots and at the end turn portions. End turn portion 19 of the coil group 21 is then placed within the flux path of an air gap 26 for electromagnetic device 27. In actual practice, one type of device 23 used had a generally C-shaped core 28, fabricated from 0.025 inch magnetic laminations, with the core periphery being covered with a coating of integral insulation, including the core faces 31, 32 at air gap 26. The electrical winding 29 of the device was constructed of four hundred turns of 0.0453 inch diameter enameled copper wire wrapped tightly around the core and held in place by cured epoxy resin. For best results, just prior to curing of the resin, the turns were subjected to a surge of electrical energy approximating the magnitude subsequently employed in the practice of the invention so that the turns tended to assume the same relative positions on the core as would occur in actual use to reduce potential stresses in the device.

As the stator core and electromagnetic device 27 are supported or maintained stationary relative to one another by any suitable arrangement and with end turn portion 19 being in the vicinity of air gap 26, a surge of electrical energy of preselected magnitude is injected into winding 29 and simultaneously generated in coil group 21. The illustrated core supporting arrangement is a standard insulated core fixture 34 while device 27 is held between a pair of insulated brackets 36, 37 secured together by winged nuts 38 and threaded bolt 39. In order to supply the desired electrical energy surge, device 27 is in series circuit with the four coil groups across terminals 41, 42 of a suitable energy surge source 40, such as the one more fully described in the R. G. Rushing Patent 3,333,328 mentioned above. A switch 43 is connected in the circuit of the source for initiating actuation of the source which is connected in turn through a standard switch 44 to an alternating current supply.

Closing of switch 43 actuates a circuit for charging a bank of capacitors in source 40 to a predetermined level, regulated by a variable transformer (not shown). Thereafter the bank discharges the surge, such as that depicted by curve 47 in FIGURE 3, into the four coil groups and winding 29 of device 27.

This surge produces a surge of transient current flow (assumed directions shown by arrows and symbol $\oplus$ in FIGURE 1) concurrently through the coils and device 27 to create a varying or transient flow of flux through air gap 26 in the manner indicated by the arrows and highly concentrated interacting varying or transient magnetic fields around end turn portion 19 in the proximity of gap 26. This in turn causes concentrated electromagnetic forces to act on the end turn portions to compact them and transfer them rapidly into an accurate position relative to both the adjacent core end face and the air gap.

More specifically, in actual practice example device 27 mentioned previously was furnished with an air gap one inch across to accommodate end turn portion 19 having a maximum cross-section dimension of 3/8 inch across before acted upon by the present invention. The initial maximum axial length of portion 19 was 1 1/8 inches, with the coils of group 21 being wound of 0.038 inch diameter aluminum wire into thirty-three, forty-four, and fifty-one turns respectively (innermost to outermost coils). The initial position of end turn portion 19 was near insulated face 32 of device 27, off-set from the axial center of air gap 26 in the broken line position best seen in FIGURE 1. A capacitor bank in source 40 rated at 480 microfarads was charged to 2,500 volts and a current surge having a peak of approximately 500 amperes (curve 47 in FIGURE 3) was injected into the coils and device 27. This transferred the end turn portions toward the center of air gap 26 and toward the adjacent core end face into the illustrated position shown by the solid lines. The insulation covering faces 31, 32 prevented potential arcing between portion 19 and the core of device 27 during this movement.

The end turn portion length "*l*" was reduced from the original dimension of 1 1/8 inch to 13/16 inch, the desired dimension as dictated by the particular application. Evidence that end turn portion was subjected to considerable force for a given energy level was shown by this accurate transfer as well as by the tight compaction attained in the end turn portion itself which was considerably reduced in cross-section. The energy level chosen to be injected should be below that which will deleteriously affect either the coils or device 27. Moreover, more than one surge may be injected if so desired and the coils and device 27 connected other than in series circuit with one another, for instance, in parallel.

Obviously, the end turn portion need not be disposed as deep within the air gap as that illustrated to attain advantages of the present invention in regard to the illustrated embodiment. It could be located initially near the flux path denoted by the curving flux lines (FIGURE 1). The size and configuration of the gap as well as initial location of the end turn portion relative to the air gap and stator core end face are factors affecting the final position attained by the end turn portions for a given magnitude of energy utilized.

If desired, a high degree of concurrent compaction and press back of coil side portions 18 may be assured by supporting a structure 48 in the bore of the core formed of electrically conductive material; e.g., copper or aluminum. Thus, the energy surge generated in the coils will establish a transient magnetic field in the vicinity of structure 48 and coil portions 18 to cause electromagnetic force interaction therebetween to effect the desired results.

Consequently, from the above, it will be appreciated that an unusually high level of force for a given energy surge and accurate positioning of coil end turn portions may be attained by practice of the present invention without the use of end turn dies. Additionally, a high degree of coil compaction is possible by an economical and versatile process.

It should be apparent to those skilled in the art that while we have shown and described what at present is considered to be the preferred embodiment of our invention in accordance with the patent statutes, it is to be understood that modifications can be made without actually departing from the true spirit and scope of this invention, and we therefore intend to cover in the following claims all such equivalent variations as fall within the invention.

Claims

What we claim as new and desire to secure by Letters Patent of the United States is:

1. A method of effecting an accurate position of at least one coil end turn portion, extending beyond a face of a magnetic core carrying at least one electrical coil, relative to the face; the method comprising the steps of: placing the at least one coil end turn portion in the vicinity of an air gap of an electromagnetic device; injecting a surge of electrical energy into the electromagnetic device to create a surge of flux across the air gap and a first transient magnetic field around the at least one end turn portion, as the portion is being maintained in the vicinity of the air gap and as a surge of electrical energy is being generated in the at least one electrical coil to establish a second transient magnetic field for interacting with the first transient magnetic field; and effecting the accurate postion of the at least one end turn portion relative to the face of the magnetic core by electromagnetic forces acting upon the at least one end turn portion produced by the flux surge, and by the first and second interacting transient magnetic fields, whereby the accurate position may be attained without use of end turn dies.

2. The method of claim 1 further including the steps of arranging electrically conductive material next to at least one slot of the magnetic core accommodating a side turn portion of the at least one coil; and effecting press-back of the side turn portion in the slot as the accurate position of the at least one end turn portion relative to the core face is being attained by establishing a transient magnetic field from the surge of electrical energy generated in the vicinity of the electrically conductive material for causing an electromagnetic force interaction between the side turn portion and adjacent electrically conductive material to effect the press-back.

3. The method of claim 1 wherein the placing of the at least one coil end turn portion in the vicinity of the air gap includes the placing of the at least one coil end turn portion off-center in the air gap, and during the effecting of the accurate position of the at least one end turn portion relative to the core face, moving the portion toward the center of the air gap as well as toward the core face and concurrently compacting the portion by virtue of the flux surge and interacting transient magnetic fields.

4. A method of controlling the desired position of at least one end turn portion of an electrical coil relative to an adjacent face of a slotted structure accommodating the electrical coil, the method comprising the steps of: disposing the at least one end turn portion in proximity to an air gap of an electromagnetic device connected to an energy surge source for supplying a surge of electrical energy thereto; and transferring of the at least one end turn portion into the desired position relative to the adjacent face of the slotted structure by supplying a surge of electrical energy to the electromagnetic device and electrical coil from the energy surge source thereby creating a surge of flux across the air gap and interacting transient magnetic fields in the vicinity of the at least one end turn portion to cause electromagnetic forces acting upon the portion for controlling the desired position relative to the adjacent face.

5. The method of claim 4 wherein during the transferring of the at least one end turn portion, the portion is also being compacted by the surge of flux across the air gap and the interacting transient magnetic fields.

References Cited

UNITED STATES PATENTS

| 3,333,327 | 8/1967 | Larsen | 29—596 |
|---|---|---|---|
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—606 |
| 3,348,183 | 10/1967 | Hodges et al. | |
| 3,353,251 | 11/1967 | Linkous | 29—205 |

JOHN F. CAMPBELL, *Primary Examiner.*

J. CLINE, *Assistant Examiner.*